(12) United States Patent
Jeong et al.

(10) Patent No.: US 10,071,538 B2
(45) Date of Patent: Sep. 11, 2018

(54) ADHESIVE FILM FOR POLARIZING PLATE, POLARIZING PLATE INCLUDING THE SAME AND OPTICAL DISPLAY INCLUDING THE SAME

(71) Applicant: SAMSUNG SDI CO., LTD., Yongin-si, Gyeonggi-do (KR)

(72) Inventors: Eun Hwan Jeong, Suwon-si (KR); Yi Eun Kim, Suwon-si (KR); Yoo Jin Suh, Suwon-si (KR); In Cheon Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 187 days.

(21) Appl. No.: 15/222,894

(22) Filed: Jul. 28, 2016

(65) Prior Publication Data

US 2017/0029665 A1 Feb. 2, 2017

(30) Foreign Application Priority Data

Jul. 31, 2015 (KR) .................. 10-2015-0109220

(51) Int. Cl.
*C08F 220/10* (2006.01)
*C09J 133/00* (2006.01)
(Continued)

(52) U.S. Cl.
CPC ............ *B32B 7/12* (2013.01); *B32B 27/08* (2013.01); *B32B 27/306* (2013.01);
(Continued)

(58) Field of Classification Search
CPC ... C08F 220/10; C08F 220/12; C09J 133/066; C09J 163/00; C09J 175/00; G02B 5/30
See application file for complete search history.

(56) References Cited

U.S. PATENT DOCUMENTS 6,469,528 B2 * 10/2002 Akikuni ............... G01R 31/311
250/492.2
8,877,883 B2 * 11/2014 Kim .................... C09J 133/02
526/328.5
(Continued)

FOREIGN PATENT DOCUMENTS

CN 103135161 A 6/2013
CN 103980844 A 8/2014
(Continued)

OTHER PUBLICATIONS

Taiwan Office action from corresponding Taiwan Application No. 105123825 dated Feb. 10, 2017 (7 pgs.).
(Continued)

*Primary Examiner* — Rip A Lee
(74) *Attorney, Agent, or Firm* — Lewis Roca Rothgerber Christie LLP

(57) ABSTRACT

An adhesive film for polarizing plates, a polarizing plate including the same, and an optical display including the same are provided. An adhesive film for polarizing plates is formed of an adhesive composition for polarizing plates, which includes a non-carboxylic acid (meth)acrylic copolymer, an isocyanate curing agent, and an epoxy curing agent, wherein the adhesive film has a modulus at 85° C. of about 0.1 MPa to about 0.8 MPa and a modulus ratio of about 3 or less, as calculated by the equation, Modulus ratio=G'(25° C.)/G'(85° C.), where G'(25° C.) is modulus (unit: MPa) at 25° C. of an adhesive film and G'(85° C.) is modulus (unit: MPa) at 85° C. of the adhesive film.

15 Claims, 3 Drawing Sheets

(51) Int. Cl.

| | | |
|---|---|---|
| *G02B 5/30* | (2006.01) | |
| *B32B 7/12* | (2006.01) | |
| *C08F 220/18* | (2006.01) | |
| *G02F 1/1335* | (2006.01) | |
| *C09J 133/08* | (2006.01) | |
| *C08G 18/62* | (2006.01) | |
| *C09J 133/06* | (2006.01) | |
| *C09J 175/04* | (2006.01) | |
| *B32B 27/08* | (2006.01) | |
| *B32B 27/30* | (2006.01) | |
| *B32B 27/32* | (2006.01) | |
| *B32B 27/36* | (2006.01) | |
| *C09J 7/38* | (2018.01) | |
| *C09J 7/22* | (2018.01) | |

(52) U.S. Cl.
CPC .......... *B32B 27/308* (2013.01); *B32B 27/325* (2013.01); *B32B 27/36* (2013.01); *B32B 27/365* (2013.01); *C08F 220/18* (2013.01); *C08G 18/6225* (2013.01); *C09J 7/22* (2018.01); *C09J 7/38* (2018.01); *C09J 133/066* (2013.01); *C09J 133/08* (2013.01); *C09J 175/04* (2013.01); *G02B 5/3041* (2013.01); *G02F 1/133528* (2013.01); *B32B 2307/4026* (2013.01); *B32B 2307/42* (2013.01); *B32B 2307/514* (2013.01); *B32B 2405/00* (2013.01); *B32B 2457/202* (2013.01); *C09J 2201/622* (2013.01); *C09J 2203/318* (2013.01); *C09J 2433/00* (2013.01); *G02B 5/3025* (2013.01)

(56) References Cited

U.S. PATENT DOCUMENTS

| | | | | |
|---|---|---|---|---|
| 8,945,705 | B2 * | 2/2015 | Cho | C09J 133/08 428/220 |
| 9,017,778 | B2 * | 4/2015 | Jang | C08L 75/00 428/1.52 |
| 9,045,671 | B2 * | 6/2015 | Han | C09J 133/08 |
| 9,097,855 | B2 * | 8/2015 | Jung | G02B 5/30 |
| 9,127,188 | B2 * | 9/2015 | Cho | G06F 3/0412 |
| 9,175,193 | B2 * | 11/2015 | Kim | C09J 7/0246 |
| 9,250,370 | B2 * | 2/2016 | Kim | C09J 175/04 |
| 9,296,929 | B2 * | 3/2016 | Jeong | C09J 133/12 |
| 9,346,986 | B2 * | 5/2016 | Kim | C09J 133/14 |
| 9,382,456 | B2 * | 7/2016 | Kim | G02B 5/3033 |
| 9,382,457 | B2 * | 7/2016 | Kim | C09J 133/14 |
| 9,404,024 | B2 * | 8/2016 | Ha | C08G 18/6229 |
| 9,428,676 | B2 * | 8/2016 | Lee | C09J 163/00 |
| 9,434,860 | B2 * | 9/2016 | Yu | C09J 7/00 |
| 9,469,663 | B2 * | 10/2016 | Park | C07F 9/582 |
| 9,482,896 | B2 * | 11/2016 | Kim | C08L 33/08 |
| 9,499,725 | B2 * | 11/2016 | Kim | C09J 133/08 |
| 9,505,960 | B2 * | 11/2016 | Park | C08F 220/18 |
| 9,550,923 | B2 * | 1/2017 | Nam | C09J 133/066 |
| 9,593,268 | B2 * | 3/2017 | Kim | C09J 133/04 |
| 9,606,265 | B2 * | 3/2017 | Lee | G02B 1/105 |
| 9,624,403 | B2 * | 4/2017 | Kim | B32B 27/285 |
| 9,765,244 | B2 * | 9/2017 | Kim | C09J 133/08 |
| 9,790,408 | B2 * | 10/2017 | Kim | C09J 133/06 |
| 9,798,060 | B2 * | 10/2017 | Kim | G02B 5/3083 |
| 9,798,185 | B2 * | 10/2017 | Kim | C08L 33/08 |
| 9,868,880 | B2 * | 1/2018 | Jeong | C09J 7/00 |
| 9,873,821 | B2 * | 1/2018 | Mun | C09J 133/14 |
| 2010/0182679 | A1 * | 7/2010 | Han | C09J 133/14 359/359 |
| 2010/0208343 | A1 * | 8/2010 | Yoshida | C08F 220/18 359/485.01 |
| 2011/0195240 | A1 * | 8/2011 | Inenaga | B32B 7/02 428/215 |
| 2014/0099495 | A1 * | 4/2014 | Kim | C09J 133/08 428/220 |
| 2014/0162044 | A1 * | 6/2014 | Lee | C09J 133/066 428/220 |
| 2014/0186554 | A1 * | 7/2014 | Jung | C09J 133/066 428/1.55 |
| 2014/0191431 | A1 * | 7/2014 | Uehara | G03F 7/0002 264/39 |
| 2014/0315019 | A1 * | 10/2014 | Cho | C09J 133/04 428/354 |
| 2015/0104650 | A1 * | 4/2015 | Yu | G02B 1/10 428/414 |
| 2015/0166856 | A1 * | 6/2015 | Yu | C09J 171/10 428/355 EP |
| 2015/0315425 | A1 * | 11/2015 | Mun | C09J 7/00 257/40 |
| 2017/0145262 | A1 * | 5/2017 | Nam | C09J 7/10 |
| 2017/0152413 | A1 * | 6/2017 | Choi | G02B 5/305 |
| 2017/0152414 | A1 * | 6/2017 | Lee | C09J 133/14 |
| 2017/0247585 | A1 * | 8/2017 | Kim | C09J 133/08 |
| 2017/0253770 | A1 * | 9/2017 | Nam | C09J 7/00 |

FOREIGN PATENT DOCUMENTS

| | | | | |
|---|---|---|---|---|
| JP | 2015-10192 A | | 1/2015 | |
| KR | 10-2014-0075519 A | * | 6/2014 | ............ C09J 133/04 |
| KR | 10-2014-0102129 A | | 8/2014 | |
| TW | 200846434 A | | 12/2008 | |
| TW | 201512349 A | | 4/2015 | |
| WO | WO 2015/012524 A1 | * | 1/2015 | ............ C09J 133/04 |

OTHER PUBLICATIONS

Office action from corresponding Korean patent application No. 10-2015-0109220, Office action dated Feb. 13, 2017 (7 pgs.).
China Office action from corresponding Chinese Patent Application No. 201610616765.7; China Office action dated Oct. 10, 2017 (7 pgs.).

* cited by examiner

ADHESIVE FILM FOR POLARIZING PLATE, POLARIZING PLATE INCLUDING THE SAME AND OPTICAL DISPLAY INCLUDING THE SAME

CROSS-REFERENCE TO RELATED APPLICATION

This application claims priority to and the benefit of Korean Patent Application No. 10-2015-0109220, filed on Jul. 31, 2015 in the Korean Intellectual Property Office, the entire content of which is incorporated herein by reference.

BACKGROUND

1. Field

Aspects of embodiments of the present invention relate to an adhesive film for polarizing plates, a polarizing plate including the same, and an optical display including the same.

2. Description of the Related Art

Liquid crystal displays include a liquid crystal panel and a polarizing plate attached to both surfaces of the liquid crystal panel. The polarizing plate includes a polarizer and a protective film formed on one or both surfaces of the polarizer and protecting the polarizer. The polarizing plate is attached to the liquid crystal panel via an adhesive film for polarizing plates. The adhesive film is formed of an adhesive composition for polarizing plates.

The adhesive composition for polarizing plates includes an adhesive resin and a curing agent. When used in a liquid crystal display, an adhesive film may be exposed to room temperature (for example, 25° C.) or high temperature (for example, 85° C.). If properties of the adhesive film significantly differ between room temperature and high temperature, reliability and processability of the adhesive film can be deteriorated. In addition, an adhesive resin having a carboxylic acid group reduces an aging period of the adhesive composition, thereby improving productivity. However, since the adhesive composition including the adhesive resin having a carboxylic acid group has a problem of corrosion of or damage to panels, an adhesive resin not having a carboxylic acid group has been widely used in recent years. Therefore, there is a need for an adhesive composition having a short aging period despite not containing a carboxylic acid group.

One example of a background technique is disclosed in Japanese Patent Laid-open Publication No. 2015-010192.

SUMMARY

According to an aspect of embodiments of the present invention, an adhesive film for polarizing plates exhibits excellent reliability by reducing a modulus ratio between room temperature and high temperature.

According to another aspect of embodiments of the present invention, an adhesive film for polarizing plates exhibits excellent heat resistance and moist-heat resistance.

According to another aspect of embodiments of the present invention, an adhesive film for polarizing plates has an excellent effect of preventing corrosion of an adherend due to a low resistance change rate thereof.

According to yet another aspect of embodiments of the present invention, an adhesive film for polarizing plates exhibits good formability and processability due to high modulus thereof and has an excellent effect in prevention of light leakage.

According to yet another aspect of embodiments of the present invention, a polarizing plate and an optical display including the adhesive film for polarizing plates as set forth above are provided.

In accordance with one or more embodiments of the present invention, an adhesive film for polarizing plates is formed of an adhesive composition for polarizing plates, which includes a non-carboxylic acid (meth)acrylic copolymer, an isocyanate curing agent, and an epoxy curing agent, and the adhesive film has a modulus at 85° C. of about 0.1 MPa to about 0.8 MPa and a modulus ratio of about 3 or less, as calculated by Equation 1:

$$\text{Modulus ratio} = G'(25°\text{ C.})/G'(85°\text{ C.}) \qquad (1),$$

where G'(25° C.) is modulus (unit: MPa) at 25° C. of an adhesive film and G'(85° C.) is modulus (unit: MPa) at 85° C. of the adhesive film.

In accordance with one or more embodiments of the present invention, an adhesive film for polarizing plates may be formed of an adhesive composition for polarizing plates, which includes a non-carboxylic acid (meth)acrylic copolymer, an isocyanate curing agent, and an epoxy curing agent, and the adhesive film has a modulus at 85° C. of about 0.1 MPa to about 0.8 MPa and a resistance change rate of less than about 10%, as calculated by Equation 2:

$$\text{Resistance change rate} = (P^2 - P^1)/P^1 \times 100 \qquad (2),$$

where $P^1$ is an initial resistance (unit: Ω) measured on a specimen in which electrodes are formed at both ends of the adhesive film, and $P^2$ is a resistance (unit: Ω) measured after the specimen is left alone at 60° C. and 95% RH for 250 hours.

In accordance with one or more embodiments of the present invention, a polarizing plate may include the adhesive film for polarizing plates as set forth above.

In accordance with one or more embodiments of the present invention, an optical display may include the adhesive film for polarizing plates as set forth above.

According to one or more embodiments of the present invention, an adhesive film for polarizing plates exhibits excellent reliability by reducing a modulus ratio between room temperature and high temperature.

According to one or more embodiments of the present invention, an adhesive film for polarizing plates exhibits excellent heat resistance and moist-heat resistance.

According to one or more embodiments of the present invention, an adhesive film for polarizing plates has an excellent effect of preventing corrosion of an adherend due to a low resistance change rate thereof.

According to one or more embodiments of the present invention, an adhesive film for polarizing plates exhibits good processability due to high modulus thereof and has an excellent effect in prevention of light leakage.

According to one or more embodiments of the present invention, a polarizing plate and an optical display, which include the adhesive film for polarizing plates as set forth above, are provided.

DETAILED DESCRIPTION

Figure 1:
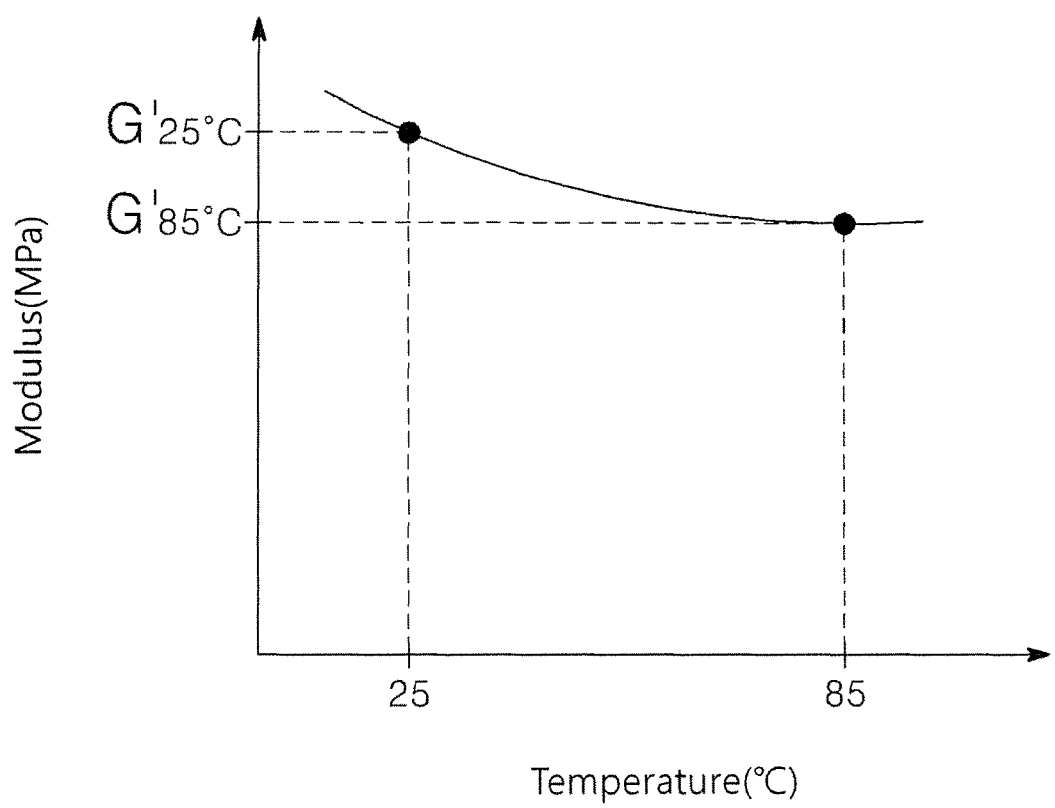
FIG. 1 is a conceptual diagram illustrating modulus ratio as defined herein.

Some embodiments of the present invention will be described in further detail with reference to the accompanying drawings. It should be understood that the present invention may be embodied in different ways and is not limited to the following embodiments. In the drawings, portions irrelevant to the description will be omitted for clarity. Like components will be denoted by like reference numerals throughout the specification.

As used herein, spatially relative terms, such as "upper" and "lower," are defined with reference to the accompanying drawings. Thus, it will be understood that the term "upper surface" can be used interchangeably with the term "lower surface."

As used herein, the terms "adhesive film for polarizing plates" and "adhesive composition for polarizing plates" can be referred to as "adhesive film" and "adhesive composition," respectively. The term "(meth)acryl" refers to acryl and/or methacryl.

As used herein, the term "modulus" refers to storage modulus, and modulus at 25° C. and modulus at 85° C. are measured on a 500 μm thick circular specimen having a diameter of 8 mm under conditions of 1 Hz and 5% strain while heating the specimen on a 8 mm-diameter disc from 25° C. to 120° C. at 10° C./min using a Physica MCR501 (Anton Paar Co., Ltd.), in which the specimen is prepared by stacking a plurality of adhesive films each having a thickness of 25 μm, followed by cutting the stacked adhesive films. Here, each of the adhesive films is a 25 μm-thick adhesive film formed by coating an adhesive composition onto a polyethylene terephthalate film, aging at 35° C. and 45% RH for a certain period of time, and separating the release film.

As used herein, the term "modulus ratio" refers to a value calculated by Equation 1 with reference to FIG. 1.

$$\text{Modulus ratio} = G'(25° C.)/G'(85° C.),\qquad \text{Equation 1}$$

where $G'(25° C.)$ is modulus (unit: MPa) at 25° C. of an adhesive film and $G'(85° C.)$ is modulus (unit: MPa) at 85° C. of the adhesive film.

As used herein, the term "equivalent weight of an isocyanate curing agent" refers to a value calculated by (amount of isocyanate curing agent in adhesive composition/molecular weight of isocyanate curing agent)×(the number of isocyanate groups per molecule of isocyanate curing agent).

As used herein, the term "equivalent weight of an epoxy curing agent" refers to a value calculated by (amount of epoxy curing agent in adhesive composition/molecular weight of epoxy curing agent)×(the number of epoxy groups per molecule of epoxy curing agent).

As used herein, the term "equivalent weight of a hydroxyl group-containing (meth)acrylic monomer for a (meth)acrylic copolymer" refers to a value calculated by (amount of hydroxyl group-containing (meth)acrylic monomer for (meth)acrylic copolymer in adhesive composition/molecular weight of hydroxyl group-containing (meth)acrylic monomer)×(the number of hydroxyl groups per molecule of hydroxyl group-containing (meth)acrylic monomer).

An adhesive film for polarizing plates according to embodiments of the present invention, and an adhesive composition for the adhesive film set forth above are described below in further detail.

The adhesive film for polarizing plates may have a modulus ratio of about 3 or less, as calculated by Equation 1. Within this range, the adhesive film can secure inhibition of light leakage and excellent reliability under high temperature or high temperature/high humidity conditions since the adhesive film has a small difference in modulus between room temperature and high temperature. In an embodiment, the adhesive film may have a modulus ratio of about 1 to about 3.

The adhesive film may have a modulus at 85° C. of about 0.1 MPa to about 0.8 MPa, and, in one embodiment, about 0.2 MPa to about 0.7 MPa, for example, 0.2 MPa, 0.3 MPa, 0.4 MPa, 0.5 MPa, 0.6 MPa, or 0.7 MPa. Within this range, the adhesive film can have excellent reliability and an excellent effect in prevention of light leakage due to high modulus at high temperature.

The adhesive film may have a modulus at 25° C. of about 0.3 MPa or greater, and, in one embodiment, about 0.5 MPa to about 2 MPa, and, in one embodiment, about 0.5 MPa to about 1.3 MPa, for example, 0.5 MPa, 0.6 MPa, 0.7 MPa, 0.8 MPa, 0.9 MPa, 1.0 MPa, 1.1 MPa, 1.2 MPa, or 1.3 MPa. Within this range, the adhesive film can exhibit excellent formability, processability, and reliability, even at room temperature due to high modulus at room temperature.

The adhesive film may be formed of an adhesive composition for polarizing plates, which includes a hydroxyl group-containing (meth)acrylic copolymer, an isocyanate curing agent, and an epoxy curing agent, wherein a ratio of an equivalent weight of the isocyanate curing agent to the sum of an equivalent weight of a hydroxyl group-containing (meth)acrylic monomer for the (meth)acrylic copolymer and an equivalent weight of the epoxy curing agent is in the range from about 1:0.1 to about 1:1. Therefore, the adhesive film can secure the modulus ratio as set forth above and can exhibit increased modulus at 25° C. and 85° C., improved pot life, improved properties in terms of change over time due to post-reaction of the curing agents, and good durability at high temperature/high humidity. In an embodiment, the ratio of the equivalent weight of the isocyanate curing agent to the sum of the equivalent weight of the hydroxyl group-containing (meth)acrylic monomer for the (meth)acrylic copolymer and the equivalent weight of the epoxy curing agent may be in the range from about 1:0.1 to about 1:0.92, from about 1:0.1 to about 1:0.83, or from about 1:0.45 to about 1:0.83. Within this range, the adhesive film can exhibit further improved durability at high temperature/high humidity.

The isocyanate curing agent may have an equivalent weight of about 5 to about 25, for example, about 10, about 11, about 12, about 13, about 14, about 15, about 16, about 17, about 18, about 19, about 20, about 21, about 22, about 23, about 24, or about 25. Within this range, the adhesive film can secure the modulus ratio as set forth above and exhibit further increased modulus at 25° C. and 85° C.

The epoxy curing agent may have an equivalent weight of about 0.05 to about 5, for example, about 0.1 to about 3, or about 0.1 to about 1. Within this range, the adhesive film can secure the modulus ratio as set forth above and exhibit further increased modulus at 25° C. and 85° C.

The hydroxyl group-containing (meth)acrylic copolymer may be a non-carboxylic acid (meth)acrylic copolymer free from a carboxylic acid group. Thus, the adhesive film has a low acid value and thus can realize an effect of directly or indirectly preventing and suppressing corrosion of an adherend. In an embodiment, the adhesive film may have an acid value of about 5 mgKOH/g or less, and, in one embodiment, about 0.1 mgKOH/g to about 3 mgKOH/g. In addition, the adhesive film for polarizing plates may have a resistance change rate of less than about 10%, and, in one embodiment, about 1% to about 5%, for example, about 1%, about 2%, about 3%, about 4%, or about 5%, as calculated by Equation 2. Within this range, the adhesive film can prevent or substantially prevent corrosion of a metal film or a metal coating layer.

$$\text{Resistance change rate}=(P^2-P^1)/P^1\times 100, \qquad \text{Equation 2}$$

where $P^1$ is initial resistance (unit: Ω) measured on a specimen in which electrodes are formed at both ends of an adhesive film, and $P^2$ is resistance (unit: Ω) measured after the specimen is left at 60° C. and 95% RH for 250 hours.

The adhesive film is optically transparent and thus can be used in optical displays. In an embodiment, the adhesive film may have an optical transmittance of about 85% or more, and, in one embodiment, about 85% to about 95%, at a wavelength of 380 nm to 780 nm.

The adhesive film may have a thickness of about 40 μm or less, and, in one embodiment, about 10 μm to about 30 μm. Within this range, the adhesive film can be used in optical displays.

The adhesive film may be produced by coating an adhesive composition for polarizing plates to a certain thickness, followed by drying the adhesive composition, and aging the adhesive composition under constant temperature and humidity conditions of about 25° C. to about 35° C. and about 30% RH to about 60% RH, without being limited thereto.

The adhesive composition for polarizing plates according to embodiments of the present invention is described below in further detail.

The adhesive composition may include a hydroxyl group-containing non-carboxylic acid (meth)acrylic copolymer, an isocyanate curing agent, and an epoxy curing agent. A hydroxyl group of the (meth)acrylic copolymer reacts with the isocyanate curing agent. A ratio of the equivalent weight of the isocyanate curing agent to the sum of the equivalent weight of the hydroxyl group-containing (meth)acrylic monomer for the (meth)acrylic copolymer and the equivalent weight of the epoxy curing agent may be in the range from about 1:0.1 to about 1:1.

Referring to Reaction Formula 1 below, the unreacted isocyanate curing agent remains in the adhesive composition or produces an amine compound (I) through reaction with water introduced from the outside, and the amine compound (I) produces a hydroxyamine compound (II) through reaction with the epoxy curing agent. Thus, a certain amount of the hydroxyamine compound (II) is produced in the adhesive film, whereby the adhesive film can maintain high modulus even at high temperature and have a reduced modulus ratio between room temperature and high temperature, as calculated by Equation 1.

Reaction Formula 1:

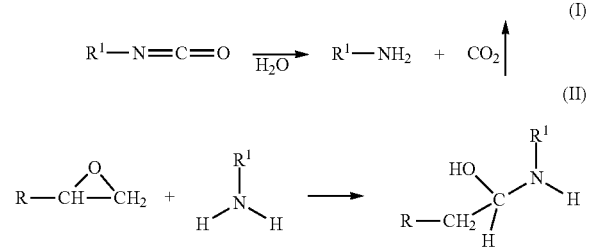

where $R^1$ is an isocyanate curing agent-derived functional group, and R is an epoxy curing agent-derived functional group.

In addition, the hydroxyamine compound (II) additionally provides a hydroxyl group, thereby improving durability of the adhesive film. Further, the residual isocyanate curing agent is removed, thereby reducing change of the adhesive film over time due to side reactions of the isocyanate curing agent.

The adhesive composition may have a viscosity at 25° C. of about 1,000 cPs to about 4,000 cPs. Within this range, the adhesive composition allows easy adjustment of thickness of the adhesive film, can prevent or substantially prevent generation of smudges on the adhesive film, and provide a uniform coating surface.

The (meth)acrylic copolymer, the isocyanate curing agent and the epoxy curing agent are different from each other. The (meth)acrylic copolymer, the isocyanate curing agent, and the epoxy curing agent will be described in further detail.

The (meth)acrylic copolymer is a binder forming the adhesive film, may be an epoxy-free (meth)acrylic copolymer not including an epoxy group, and may be a copolymer of a (meth)acrylic monomer mixture. The (meth)acrylic monomer mixture may include a hydroxyl group-containing (meth)acrylic monomer and an unreactive (meth)acrylic monomer. For example, the (meth)acrylic monomer mixture may include about 95% by weight (wt %) to about 99.9 wt % of the unreactive (meth)acrylic monomer and about 0.1 wt % to about 5 wt % of the hydroxyl group-containing (meth)acrylic monomer. Within this range, gelation of the adhesive composition can be delayed, thereby increasing pot life.

The unreactive (meth)acrylic monomer may include at least one of an unsubstituted or substituted $C_1$ to $C_{20}$ alkyl group-containing (meth)acrylic monomer, an unsubstituted or substituted $C_3$ to $C_{20}$ cycloalkyl group-containing (meth)acrylic monomer, and an unsubstituted or substituted $C_6$ to $C_{20}$ aromatic group-containing (meth)acrylic monomer.

As used herein, the term "substituted" means that at least one hydrogen atom of a functional group is substituted with a $C_1$ to $C_{10}$ alkyl group, a halogen (F, Cl, Br, or I), a $C_3$ to $C_{10}$ cycloalkyl group, a $C_6$ to $C_{20}$ aryl group, or a $C_7$ to $C_{20}$ arylalkyl group.

The unsubstituted or substituted $C_1$ to $C_{20}$ alkyl group-containing (meth)acrylic monomer may include a $C_1$ to $C_{20}$ alkyl group-containing (meth)acrylic acid ester, in which the $C_1$ to $C_{20}$ alkyl group may be unsubstituted or substituted. For example, the $C_1$ to $C_{20}$ alkyl group-containing (meth)acrylic acid ester may include at least one of methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, 2-ethylhexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, without being limited thereto. These may be used alone or in combination thereof.

The unsubstituted or substituted $C_3$ to $C_{20}$ cycloalkyl group-containing (meth)acrylic monomer may include a $C_3$ to $C_{20}$ cycloalkyl group-containing (meth)acrylic acid ester, in which the $C_3$ to $C_{20}$ cycloalkyl group may be unsubstituted or substituted. For example, the $C_3$ to $C_{20}$ cycloalkyl group-containing (meth)acrylic acid ester may include at least one of cyclopentyl (meth)acrylate, cyclohexyl (meth)acrylate, and isobornyl (meth)acrylate. These may be used alone or in combination thereof.

The unsubstituted or substituted $C_6$ to $C_{20}$ aromatic group-containing (meth)acrylic monomer may include a $C_6$ to $C_{20}$ aromatic group-containing (meth)acrylic acid ester, in which the $C_6$ to $C_{20}$ aromatic group may be unsubstituted or substituted. For example, the $C_6$ to $C_{20}$ aromatic group-containing (meth)acrylic acid ester may include at least one of phenyl (meth)acrylate and benzyl (meth)acrylate. These may be used alone or in combination thereof.

The hydroxyl group-containing (meth)acrylic monomer can further improve durability of the adhesive film. For example, the hydroxyl group-containing (meth)acrylic monomer may include at least one of a $C_1$ to $C_{20}$ alkyl group-containing (meth)acrylic monomer having at least one hydroxyl group, a $C_3$ to $C_{20}$ cycloalkyl group-containing (meth)acrylic monomer having a hydroxyl group, and a $C_6$ to $C_{20}$ aromatic group-containing (meth)acrylic monomer having a hydroxyl group. Specifically, the hydroxyl group-containing (meth)acrylic monomer may include at least one of 2-hydroxyethyl (meth)acrylate, 2-hydroxypropyl (meth) acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth) acrylate, 2-hydroxy-3-phenyloxypropyl (meth)acrylate, 4-hydroxycyclopentyl (meth)acrylate, and 4-hydroxycyclohexyl (meth)acrylate. These may be used alone or in combination thereof.

The (meth)acrylic copolymer may be prepared through polymerization of the monomer mixture by a typical method. The polymerization method may include a typical method known to those skilled in the art. For example, the (meth)acrylic copolymer may be prepared by adding an initiator to the monomer mixture, followed by performing typical polymerization, for example, suspension polymerization, emulsion polymerization, solution polymerization, or the like. Polymerization may be performed at a polymerization temperature of about 65° C. to about 70° C. for about 6 hours to about 8 hours. The initiator may be a typical initiator including azo-based initiators, peroxides such as benzoyl peroxide or acetyl peroxide, and the like.

The (meth)acrylic copolymer may have a weight average molecular weight (Mw) of 2,000,000 or less, and, in one embodiment, about 800,000 to about 1,500,000. Within this range, the adhesive composition can secure high durability of the adhesive film. The weight average molecular weight may be calculated relative to a polystyrene standard using gel permeation chromatography.

The (meth)acrylic copolymer may have a glass transition temperature of about −60° C. to about 0° C., and, in one embodiment, about −50° C. to about −20° C. Within this range, the adhesive composition can have flowability as an adhesive and can secure high durability of the adhesive film. The (meth)acrylic copolymer may have a polydispersity of about 3 to about 10, and, in one embodiment, about 3 to about 6. Within this range, polymerization of the (meth) acrylic copolymer is stable and deterioration in durability of the adhesive film can be prevented. The (meth)acrylic copolymer may have an acid value of about 5 mgKOH/g or less, and, in one embodiment, about 0.1 mgKOH/g to about 3 mgKOH/g. Within this range, the adhesive film can realize an effect of directly or indirectly preventing and suppressing corrosion of an adherend.

The isocyanate curing agent reacts with a hydroxyl group of the (meth)acrylic copolymer, thereby increasing the modulus of the adhesive film, and produces a certain amount of the hydroxyamine compound, thereby reducing the modulus ratio of the adhesive film between room temperature and high temperature while maintaining high modulus of the adhesive film.

The isocyanate curing agent may include bi- or more functional, for example, bi- to hexa-functional isocyanate curing agents to improve the modulus and gel fraction of the adhesive film. In an embodiment, the isocyanate curing agent may include at least one of trifunctional isocyanate curing agents including trifunctional trimethylolpropane-modified toluene diisocyanate adducts, trifunctional toluene diisocyanate trimers, trimethylolpropane-modified xylene diisocyanate adducts and the like; hexafunctional trimethylolpropane-modified toluene diisocyanate; and hexafunctional isocyanurate-modified toluene diisocyanate. These curing agents may be used alone or in combination thereof.

The isocyanate curing agent may be present in an amount of about 5 parts by weight or more, and, in one embodiment, about 5 parts by weight to about 15 parts by weight, relative to 100 parts by weight of the (meth)acrylic copolymer. Within this range, the adhesive composition can secure high modulus and durability of the adhesive film.

The epoxy curing agent reacts with the isocyanate curing agent and thus produces the hydroxyamine compound. The adhesive film can have improved durability due to a hydroxyl group of the produced amine compound.

The epoxy curing agent may include bisphenol A epichlorohydrin epoxy resins, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, sorbitol polyglycidyl ether, polyglycerol polyglycidyl ether, pentaerythritol polyglycidyl ether, diglycerol polyglycidyl ether, 1,3-bis(N, N-diglycidylaminomethyl)cyclohexane, 1,3-bis(N,N-diglycidylaminomethyl)benzene, N,N,N',N'-tetraglycidyl-m-xylenediamine, and the like.

The epoxy curing agent may be present in an amount of about 0.1 parts by weight to about 2 parts by weight relative to 100 parts by weight of the (meth)acrylic copolymer. Within this range, the adhesive film having high modulus can exhibit improved durability.

A weight ratio of the epoxy curing agent to the isocyanate curing agent in the adhesive composition may be in the range from about 1:2 to about 1:100, and, in one embodiment, from about 1:2 to about 1:50. Within this range, the adhesive film can exhibit effectively improved modulus and improved durability.

The adhesive composition may further include a silane coupling agent. The silane coupling agent can improve adhesion of the adhesive film to an adherend, such as glass.

The silane coupling agent may include a typical silane coupling agent known to those skilled in the art. For example, the silane coupling agent may include at least one selected from the group consisting of: epoxy structure-containing silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyltrimethoxysilane, N-(2-aminoethyl)-3-aminopropyltrimethoxysilane, and N-(2-aminoethyl)-3-aminopropylmethyldimethoxysilane; 3-chloropropyltrimethoxysilane, and the like, without being limited thereto.

The silane coupling agent may be present in an amount of about 0.1 parts by weight to about 5 parts by weight, and, in one embodiment, about 0.1 parts by weight to about 1 part by weight, relative to 100 parts by weight of the (meth) acrylic copolymer. Within this range, the adhesive composition can secure excellent durability and reliability of the adhesive film and allows little change in components and properties thereof over time.

The adhesive composition may further include typical additives. The additives may include antistatic agents, UV absorbers, antioxidants, adhesion-imparting resins, plasticizers, and the like.

A polarizing plate according to the present invention is described below in further detail.

The polarizing plate according to the present invention may include the adhesive film according to the present invention. The polarizing plate according to one or more embodiments of the present invention may be manufactured by bonding the adhesive film according to the present invention to a surface of a polarizing plate, or manufactured by coating the adhesive composition for polarizing plates onto a surface of a polarizing plate to a certain thickness, followed by aging. The polarizing plate may include a polarizer and an optical film formed on at least one surface of the polarizer. The polarizer and the optical film may include typical polarizers and optical films known to those skilled in the art, respectively. The polarizing plate according to the present invention includes the adhesive film as set forth above, thereby securing good durability and little change in properties over time while effectively preventing or substantially preventing light leakage.

A polarizing plate for durability evaluation, which includes the adhesive film according to the present invention, may have a defect rate of about 5% or less, and, in one embodiment, about 0% to about 2%, and, in one embodiment, about 0% to about 1.7%, as calculated by Equation 4 after the polarizing plate for durability evaluation is left at 85° C. (high temperature) for 500 hours and at 60° C. and 95% RH (high temperature and high humidity) for 500 hours.

$$\text{Defect rate (\%)}=|A+B|/T\times 100, \quad \text{Equation 4}$$

where T is a maximum diagonal length of the polarizing plate for durability evaluation, and A and B are lengths from both end points of the maximum diagonal of the polarizing plate for durability evaluation to defect generation regions on the maximum diagonal, respectively. Here, defects mean that the polarizing plate for durability evaluation suffers from wrinkling or detachment on a surface thereof, as compared with the polarizing plate before being left alone at high temperature or at high temperature and high humidity. Within this range, since the polarizing plate does not suffer from wrinkling or detachment despite being left under severe conditions such as high temperature or high temperature and high humidity, the polarizing plate can exhibit good durability and reliability and thus allow an optical display to have good image quality.

Figure 2:
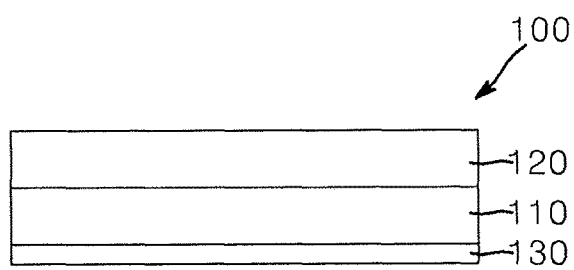
FIG. 2 is a sectional view of a polarizing plate according to an embodiment of the present invention.

FIG. 2 is a sectional view of a polarizing plate according to an embodiment of the present invention. Referring to FIG. 2, a polarizing plate 100 according to an embodiment may include a polarizer 110, a first optical film 120 formed on an upper surface of the polarizer 110, and an adhesive film 130 formed on a lower surface of the polarizer 110, and the adhesive film 130 may include the adhesive film for polarizing plates according to the present invention. Although not shown in FIG. 2, the adhesive film 130 may be bonded to a liquid crystal panel.

The polarizer 110 includes a polyvinyl alcohol film and is not particularly limited so long as the polarizer is a polyvinyl alcohol film regardless of manufacturing methods. For example, the polarizer may be a modified polyvinyl alcohol film, such as a partially formalized polyvinyl alcohol film, an acetoacetyl group-modified polyvinyl alcohol film, or the like. In an embodiment, the polarizer is produced by dyeing a polyvinyl alcohol film with iodine or dichroic dyes, followed by stretching the polyvinyl alcohol film in a certain direction. In an embodiment, the polarizer is produced through swelling, dyeing, and stretching processes. A method of performing each of the processes is generally known to those skilled in the art. The polarizer 110 may have a thickness of about 5 μm to about 50 μm. Within this range, the polarizer 110 can be used in optical displays.

The first optical film 120 may be formed of an optically transparent resin, such as, in one embodiment, at least one of cyclic polyolefin including amorphous cyclic olefin polymer (COP) and the like, poly(meth)acrylate, polycarbonate, polyester including polyethylene terephthalate (PET) and the like, cellulose ester including triacetyl cellulose (TAC) and the like, polyethersulfone, polysulfone, polyamide, polyimide, polyolefin, polyarylate, polyvinyl alcohol, polyvinyl chloride, and polyvinylidene chloride resins. The first optical film 120 may have a thickness of about 10 μm to about 200 μm, for example, about 20 μm to about 120 μm. Within this range, the first optical film 120 can be used in optical displays.

Figure 3:
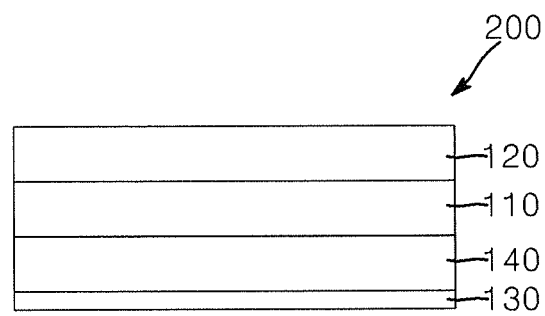
FIG. 3 is a sectional view of a polarizing plate according to another embodiment of the present invention.

FIG. 3 is a sectional view of a polarizing plate according to another embodiment of the present invention. Referring to FIG. 3, a polarizing plate 200 according to another embodiment may include the polarizer 110, the first optical film 120 formed on an upper surface of the polarizer 110, a second optical film 140 formed on a lower surface of the polarizer 110, and the adhesive film 130 formed on a lower surface of the second optical film 140, and the adhesive film 130 may include the adhesive film for polarizing plates according to the present invention. The polarizing plate 200 is substantially the same as the polarizing plate 100 according to the above-described embodiment except that the second optical film 140 is further formed between the polarizer 110 and the adhesive film 130. The second optical film 140 may be formed of a resin which is the same as or different from that of the first optical film 120. The second optical film 140 may have a thickness which is equal to or different from that of the first optical film 120.

Although not shown in FIGS. 2 and 3, a bonding layer formed of a bonding agent for polarizing plates may be included between the polarizer and the first optical film and between the polarizer and the second optical film. The bonding agent for polarizing plates may include water-based, pressure-sensitive, and UV curable bonding agents.

An optical display according to an embodiment of the present invention may include the polarizing plate according to the present invention. For example, the optical display may include liquid crystal displays and organic light emitting displays, without being limited thereto.

Figure 4:
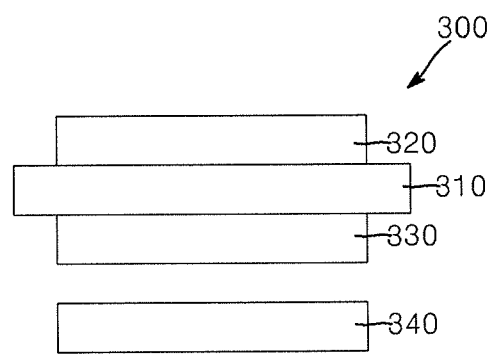
FIG. 4 is a sectional view of a liquid crystal display according to an embodiment of the present invention.

FIG. 4 is a sectional view of a liquid crystal display according to an embodiment of the present invention. Referring to FIG. 4, a liquid crystal display 300 according to an embodiment may include a liquid crystal display panel 310, a first polarizing plate 320 formed on an upper surface of the liquid crystal display panel 310, a second polarizing plate 330 formed on a lower surface of the liquid crystal display panel 310, and a backlight unit 340 under the second polarizing plate 330, and at least one of the first and second polarizing plates 320 and 330 may include the polarizing plate according to the present invention.

The liquid crystal display panel may employ a twisted nematic (TN) mode, a vertical alignment (VA) mode, a patterned vertical alignment (PVA) mode, or a super-patterned vertical alignment (S-PVA) mode. In particular, a liquid crystal display panel of a TN mode can have an excellent effect in prevention of light leakage.

Next, the present invention will be described in more detail with reference to some examples. It should be understood that these examples are provided for illustration only and are not to be construed in any way as limiting the present invention.

EXAMPLE

Details of components used in Examples and Comparative Examples are as follows.

(A) (Meth)acrylic copolymer:

(A1) (Meth)acrylic copolymer of Preparative Example 1

(A2) (Meth)acrylic copolymer of Preparative Example 2

(B) Isocyanate curing agent: L-45 (toluene diisocyanate (TDI) curing agent, Soken Co., Ltd.)

(C) Epoxy curing agent: E-5XM (Soken Co., Ltd.)

(D) Silane coupling agent: A-50 (Soken Co., Ltd.)

Preparative Example 1

Preparation of (meth)acrylic copolymer

In a 1 L reactor provided with a cooler to facilitate temperature adjustment while purging with nitrogen, 100 parts by weight of a monomer mixture including 70 wt % of n-butyl acrylate (BA), 29 wt % of methyl acrylate (MA) and 1 wt % of 2-hydroxyethyl acrylate (2-HEA) was prepared. The reactor was purged with nitrogen gas for 1 hour to remove oxygen from the monomer mixture and then was maintained at 65° C. The monomer mixture was uniformly stirred, followed by adding 0.07 parts by weight of azobisisobutyronitrile (AIBN) as an initiator into the reactor, and then subjected to reaction for 8 hours, thereby preparing an acrylic copolymer having a weight average molecular weight of 1,000,000 and an acid value of 3 mgKOH/g.

Preparative Example 2

Preparation of (meth)acrylic copolymer

In a 1 L reactor provided with a cooler to facilitate temperature adjustment while purging with nitrogen, 100 parts by weight of a monomer mixture including 70 wt % of n-butyl acrylate (BA), 28 wt % of methyl acrylate (MA), 1 wt % of 2-hydroxyethyl acrylate (2-HEA) and 1 wt % of glycidyl methacrylate (GMA) was prepared. The reactor was purged with nitrogen gas for 1 hour to remove oxygen from the monomer mixture and then was maintained at 65° C. The monomer mixture was uniformly stirred, followed by adding 0.07 parts by weight of azobisisobutyronitrile (AIBN) as an initiator, and then subjected to reaction for 8 hours, thereby preparing an acrylic copolymer having a weight average molecular weight of 1,000,000 and an acid value of 3 mgKOH/g.

Example 1

100 parts by weight of the (A1) (meth)acrylic copolymer of Preparative Example 1, 5 parts by weight of the (B) isocyanate curing agent, 0.2 parts by weight of the (C) epoxy curing agent, and 0.1 parts by weight of the (D) silane coupling agent were mixed. The mixture was diluted with methylethylketone (MEK) and stirred for 30 minutes, thereby preparing an adhesive composition.

The adhesive composition was coated onto a polyethylene terephthalate film release film, dried at 90° C. for 4 minutes, followed by releasing from the release film, thereby preparing an adhesive sheet (thickness: 25 μm).

A polyvinyl alcohol film was stretched to 3 times an initial length thereof at 60° C., followed by iodine adsorption onto the polyvinyl alcohol film, and then stretched to 2.5 times the length of the stretched film in an aqueous solution of boric acid at 40° C., thereby preparing a polarizer. Triacetyl cellulose films were bonded to both surfaces of the polarizer, thereby manufacturing a polarizing plate.

The adhesive sheet was attached to one surface of one of the triacetyl cellulose films, followed by aging at constant temperature and humidity (35° C., 45% RH) for a certain aging period, thereby providing the polarizing plate including an adhesive film.

Examples 2 to 4

Adhesive compositions and polarizing plates were prepared in the same manner as in Example 1 except that the amount of each of the isocyanate curing agent and the epoxy curing agent was changed as listed in Table 1 (unit: parts by weight).

Comparative Example 1

An adhesive composition and a polarizing plate were prepared in the same manner as in Example 1 except that the adhesive composition did not include any epoxy curing agent.

Comparative Example 2

An adhesive composition and a polarizing plate were prepared in the same manner as in Example 1 except that the adhesive composition included 10 parts by weight of the isocyanate curing agent and did not include any epoxy curing agent.

Comparative Example 3

An adhesive composition and a polarizing plate were prepared in the same manner as in Example 3 except that the adhesive composition did not include any epoxy curing agent, and that the (A2) (meth)acrylic copolymer of Preparative Example 2 was used.

The adhesive compositions and the polarizing plates of the Examples and Comparative Examples were evaluated as to properties as listed in Table 1.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| (A) (parts by weight) | (A1) | 100 | 100 | 100 | 100 | 100 | 100 | — |
|  | (A2) | — | — | — | — | — | — | 100 |
| (B) (parts by weight) | | 5 | 5 | 10 | 10 | 5 | 10 | 10 |
| (C) (parts by weight) | | 0.2 | 2 | 0.2 | 2 | — | — | — |
| (D) (parts by weight) | | 0.1 | 0.1 | 0.1 | 0.1 | 0.1 | 0.1 | 0.1 |
| Equivalent weight of isocyanate curing agent | | 10.3 | 10.3 | 20.6 | 20.6 | 10.3 | 20.6 | 20.6 |
| Equivalent weight of epoxy curing agent | | 0.11 | 1.11 | 0.11 | 1.11 | — | — | — |
| Equivalent weight of isocyanate curing agent: [Equivalent weight of hydroxyl group-containing (meth)-acrylic monomer for (meth)acrylic copolymer + Equivalent weight of epoxy curing agent] | | 1:0.83 | 1:0.92 | 1:0.41 | 1:0.47 | — | — | — |
| Modulus at 85° C. of adhesive film (MPa) | | 0.30 | 0.33 | 0.55 | 0.64 | 0.15 | 0.40 | 0.66 |
| Modulus at 25° C. of adhesive film (MPa) | | 0.55 | 0.61 | 1.30 | 1.32 | 0.51 | 1.22 | 1.38 |
| Modulus ratio of adhesive film | | 1.83 | 1.85 | 2.36 | 2.06 | 3.40 | 3.05 | 2.09 |
| Resistance change rate (%) | | 4 | 3 | 3 | 4 | 3 | 4 | 4 |
| Aging period (days) | | 2 | 2 | 2 | 2 | 5 | 7 | 2 |
| Durability (Defect rate, %) | High temperature | 0 | 0 | 0 | 0 | 2.0 | 5.8 | 1.3 |
|  | High temperature and High humidity | 0 | 0 | 1.7 | 0 | 29.2 | 75.6 | 16.5 |

As shown in Table 1, the adhesive films for polarizing plates according to embodiments of the present invention exhibited excellent reliability due to low modulus ratio and good processability due to high modulus even at high temperature, and had an excellent effect in prevention of light leakage. In addition, since the adhesive films for polarizing plates according to the present invention had a low resistance change rate due to good durability, the adhesive films for polarizing plates according to embodiments of the present invention had an excellent effect of preventing corrosion of an adherend.

Conversely, the adhesive films of Comparative Examples 1 and 2 not including any epoxy curing agent had a high modulus ratio, an insufficient effect in prevention of light leakage, and poor durability. In the adhesive film of Comparative Example 3 including the epoxy group-containing (meth)acrylic copolymer, since the epoxy group was copolymerized with an acrylic polymer, the epoxy group had a limit in movement and thus did not sufficiently react. Thus, the adhesive film of Comparative Example 3 did not exhibit improved durability.

(1) Modulus: Each of the adhesive compositions of the Examples and Comparative Examples was coated onto a polyethylene terephthalate (PET) film, followed by aging at 35° C. and 45% RH for 7 days, thereby preparing an adhesive film having a thickness of 25 μm. Next, the adhesive film was released from the release film, and the plural adhesive films were stacked and cut to provide a circular specimen having a thickness of 500 μm and a diameter of 8 mm. Modulus at 25° C. and modulus at 85° C. were measured on the specimen on a 8 mm-diameter disc under conditions of 1 Hz and 5% strain while heating from 25° C. to 120° C. at 10° C./min using a Physica MCR501 (Anton Paar Co., Ltd.).

(2) Modulus ratio: Modulus ratio was calculated by Equation 1 based on the moduli of the adhesive film obtained in (1).

Figure 5:
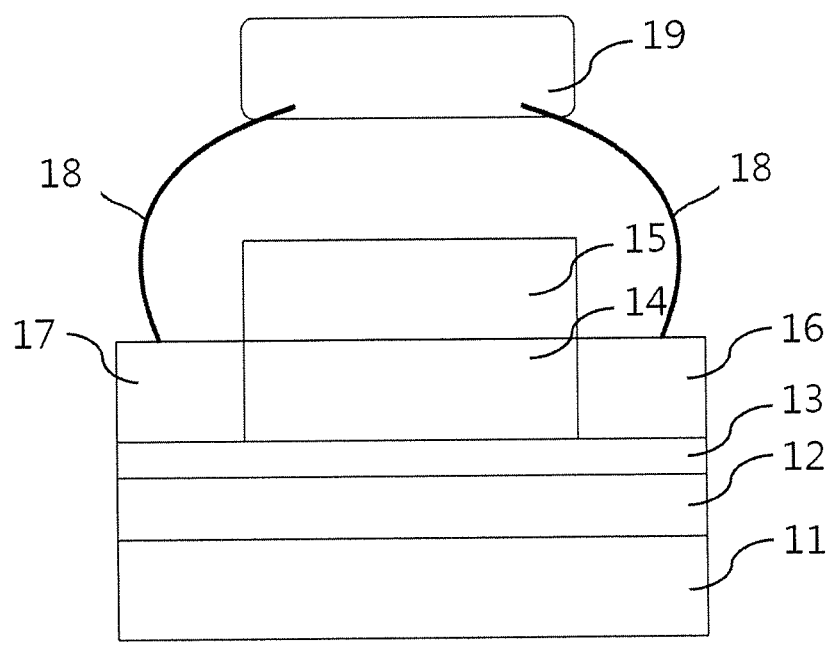
FIG. 5 is a sectional view of a specimen for measuring resistance change.

(3) Resistance change rate: Referring to FIG. 5, a polyethylene terephthalate (PET) film 12 coated with indium tin oxide (ITO) was stacked on a glass plate 11, followed by placing the specimen for measuring modulus (a stacked body of the adhesive film 14 obtained in (1) and a PET film 15) at the center of an ITO surface 13. Next, electrodes 16, 17 were formed at both ends of the ITO surface 13, to which the adhesive film was not attached, using silver pastes, thereby preparing a specimen. With wires 18 connected to the electrodes 16 and 17, initial resistance ($P^1$) was measured by a resistance meter 19. The specimen was left alone at 60° C. and 95% RH for 250 hours, followed by measuring resistance ($P^2$). A resistance change rate was calculated by Equation 2:

$$\text{Resistance change rate} = (P^2 - P^1)/P^1 \times 100 \qquad (2),$$

where $P^1$ is initial resistance (unit: Ω) measured on a specimen in which electrodes are formed at both ends of an adhesive film, and $P^2$ is resistance (unit: Ω) measured after the specimen is left alone at 60° C. and 95% RH for 250 hours.

(4) Aging period: Creep was measured on each of the adhesive compositions of the Examples and Comparative Examples every 24 hours while aging at 35° C. and 45% RH. A period of time initially providing a creep change rate of 10% or less was defined as an aging period. The creep change rate was calculated by Equation 3:

$$\text{Creep change rate} = |B - A|/A \times 100 \qquad (3),$$

where A is a creep at time t, B is a creep at time t+24, and t is 0, 24, 48, 72, 96, 120, or 144 (unit: hours (h)).

*Creep (unit: μm): A polarizing plate, to which each of the adhesive sheets of the Examples and Comparative Examples was attached, was subjected to aging under constant temperature and humidity conditions of 35° C. and 45% RH, and was cut into a sample having a size of 15 mm×120 mm (width×length). A 15 mm×15 mm-size portion of the sample was laminated onto an alkali-free glass plate such that the adhesive film was laminated onto the alkali-free glass plate. With the alkali-free glass plate fixed, a non-attached portion of the sample was pulled by a force of 2,250 gf at an angle of 180° for 1000 seconds. The creep refers to a distance by which the polarizing plate is pushed.

(5) Durability: Each of the adhesive sheets of the Examples and Comparative Examples was subjected to aging at 35° C. and 45% RH for 7 days, thereby preparing an adhesive film. A polyvinyl alcohol film was stretched to 3 times an initial length thereof at 60° C., followed by iodine adsorption onto the polyvinyl alcohol film, and then stretched to 2.5 times the length of the stretched film in an aqueous solution of boric acid at 40° C., thereby manufacturing a polarizer. Triacetyl cellulose films were bonded to both surfaces of the polarizer, thereby manufacturing a polarizing plate. The adhesive film was laminated onto the polarizing plate, followed by cutting the laminated structure into a rectangle shape having a size of 100 mm×80 mm (length×width), thereby manufacturing a polarizing plate for durability evaluation. The polarizing plate for durability evaluation was laminated onto an alkali-free glass plate having the same size as that of the polarizing plate, followed by autoclaving at 50° C. for 1000 seconds, thereby preparing specimens in which the polarizing plate for durability evaluation was stacked on the glass plate.

Figure 6:
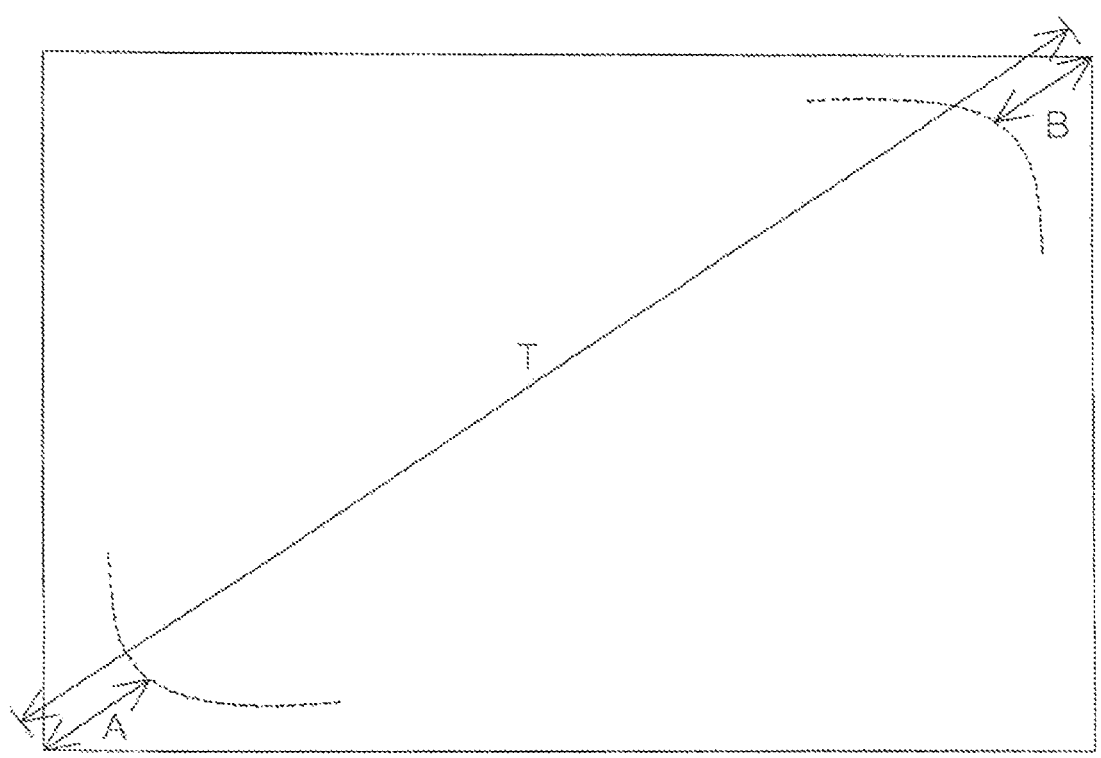
FIG. 6 is a conceptual diagram for durability evaluation of a polarizing plate.

The specimens including the stacked polarizing plate for durability evaluation were left alone at 85° C. (high temperature) for 500 hours and at 60° C. and 95% RH (high temperature and high humidity) for 500 hours, followed by evaluating defect rates of the specimens. Referring to FIG. 6, the defect rate was calculated by Equation 4:

$$\text{Defect rate (\%)} = |A+B|/T \times 100 \quad (4),$$

where T is a maximum diagonal length of the polarizing plate for durability evaluation, and A and B are lengths from both end points of the maximum diagonal of the polarizing plate for durability evaluation to defect generation regions on the maximum diagonal, respectively. Here, defects mean that the polarizing plate for durability evaluation suffers from wrinkling or detachment on a surface thereof, as compared with the polarizing plate before being left alone at high temperature or at high temperature and high humidity. In FIG. 6, a dotted line denotes a boundary between a defect generation region and a defect free region on the surface of the polarizing plate. Defects are mainly generated at both ends of the polarizing plate and scarcely generated at a central region thereof.

While some embodiments of the present invention have been described herein, it should be understood that various modifications, changes, alterations, and equivalent embodiments can be made by those skilled in the art without departing from the spirit and scope of the invention.

What is claimed is:

1. An adhesive film for polarizing plates, the adhesive film being formed of an adhesive composition comprising: a non-carboxylic acid (meth)acrylic copolymer; an isocyanate curing agent; and an epoxy curing agent, wherein the adhesive film has a modulus at 85° C. of about 0.1 MPa to about 0.8 MPa and a modulus ratio of 3 or less, as calculated by Equation 1:

$$\text{Modulus ratio} = G'(25° C.)/G'(85° C.), \quad \text{Equation 1}$$

where $G'(25° C.)$ is modulus (unit: MPa) at 25° C. of the adhesive film and $G'(85° C.)$ is modulus (unit: MPa) at 85° C. of the adhesive film.

2. The adhesive film according to claim 1, wherein the adhesive film has a resistance change rate of less than 10%, as calculated by Equation 2:

$$\text{Resistance change rate} = (P^2 - P^1)/P^1 \times 100, \quad \text{Equation 2}$$

where $P^1$ is initial resistance (unit: Ω) measured on a specimen in which electrodes are formed at both ends of the adhesive film, and $P^2$ is resistance (unit: Ω) measured after the specimen is left alone at 60° C. and 95% RH for 250 hours.

3. The adhesive film according to claim 1, wherein the adhesive film has a modulus at 25° C. of about 0.3 MPa or greater.

4. The adhesive film according to claim 1, wherein a polarizing plate for durability evaluation, to which the adhesive film for polarizing plates is attached, has a defect rate of about 5% or less, as calculated by Equation 4 after the polarizing plate is left at 85° C. for 500 hours and at 60° C. and 95% RH for 500 hours, wherein Equation 4 is as follows:

$$\text{Defect rate (\%)} = |A+B|/T \times 100, \quad \text{Equation 3}$$

where T is a maximum diagonal length of the polarizing plate for durability evaluation, and A and B are lengths from both end points of a maximum diagonal of the polarizing plate for durability evaluation to defect generation regions on the maximum diagonal, respectively.

5. The adhesive film according to claim 1, wherein the non-carboxylic acid (meth)acrylic copolymer has a hydroxyl group, and a ratio of an equivalent weight of the isocyanate curing agent to the sum of an equivalent weight of a hydroxyl group-containing (meth)acrylic monomer for the non-carboxylic acid (meth)acrylic copolymer and an equivalent weight of the epoxy curing agent is about 1:0.1 to about 1:1.

6. The adhesive film according to claim 1, wherein the adhesive composition comprises 100 parts by weight of the non-carboxylic acid (meth)acrylic copolymer, 5 parts by weight or more of the isocyanate curing agent, and about 0.1 parts by weight to about 2 parts by weight of the epoxy curing agent.

7. The adhesive film according to claim 1, wherein the non-carboxylic acid (meth)acrylic copolymer comprises a copolymer of a monomer mixture comprising about 95 wt % to about 99.9 wt % of an unreactive (meth)acrylic monomer and about 0.1 wt % to about 5 wt % of a hydroxyl group-containing (meth)acrylic monomer.

8. The adhesive film according to claim 7, wherein the unreactive (meth)acrylic monomer comprises an unsubstituted or substituted $C_1$ to $C_{20}$ alkyl group-containing (meth)acrylic monomer.

9. The adhesive film according to claim 1, wherein the epoxy curing agent comprises at least one of bisphenol A epichlorohydrin epoxy resins, ethylene glycol diglycidyl ether, polyethylene glycol diglycidyl ether, glycerin diglycidyl ether, glycerin triglycidyl ether, 1,6-hexanediol diglycidyl ether, trimethylolpropane triglycidyl ether, sorbitol polyglycidyl ether, polyglycerol polyglycidyl ether, pentaerythritol polyglycidyl ether, diglycerol polyglycidyl ether, 1,3-bis(N,N-diglycidylaminomethyl)benzene, or N,N,N',N'-tetraglycidyl-m-xylenediamine.

10. The adhesive film according to claim 1, wherein a weight ratio of the epoxy curing agent to the isocyanate curing agent in the adhesive composition is about 1:2 to about 1:100.

11. The adhesive film according to claim 1, wherein the adhesive composition further comprises a silane coupling agent.

12. A polarizing plate comprising the adhesive film for polarizing plates according to claim 1.

13. An optical display comprising the polarizing plate according to claim 12.

14. The optical display according to claim 13, comprising liquid crystals of a twisted nematic (TN) mode.

15. A polarizing plate comprising an optical film, a bonding layer stacked on the optical film, a polarizer stacked on the bonding layer, and an adhesive film stacked on the polarizer, wherein the adhesive film comprises the adhesive film for polarizing plates according to claim 1.

\* \* \* \* \*